Dec. 22, 1942.   G. SLAYTER   2,306,347
METHOD AND APPARATUS FOR MAKING FIBROUS GLASS PRODUCTS
Filed July 28, 1939   3 Sheets-Sheet 1
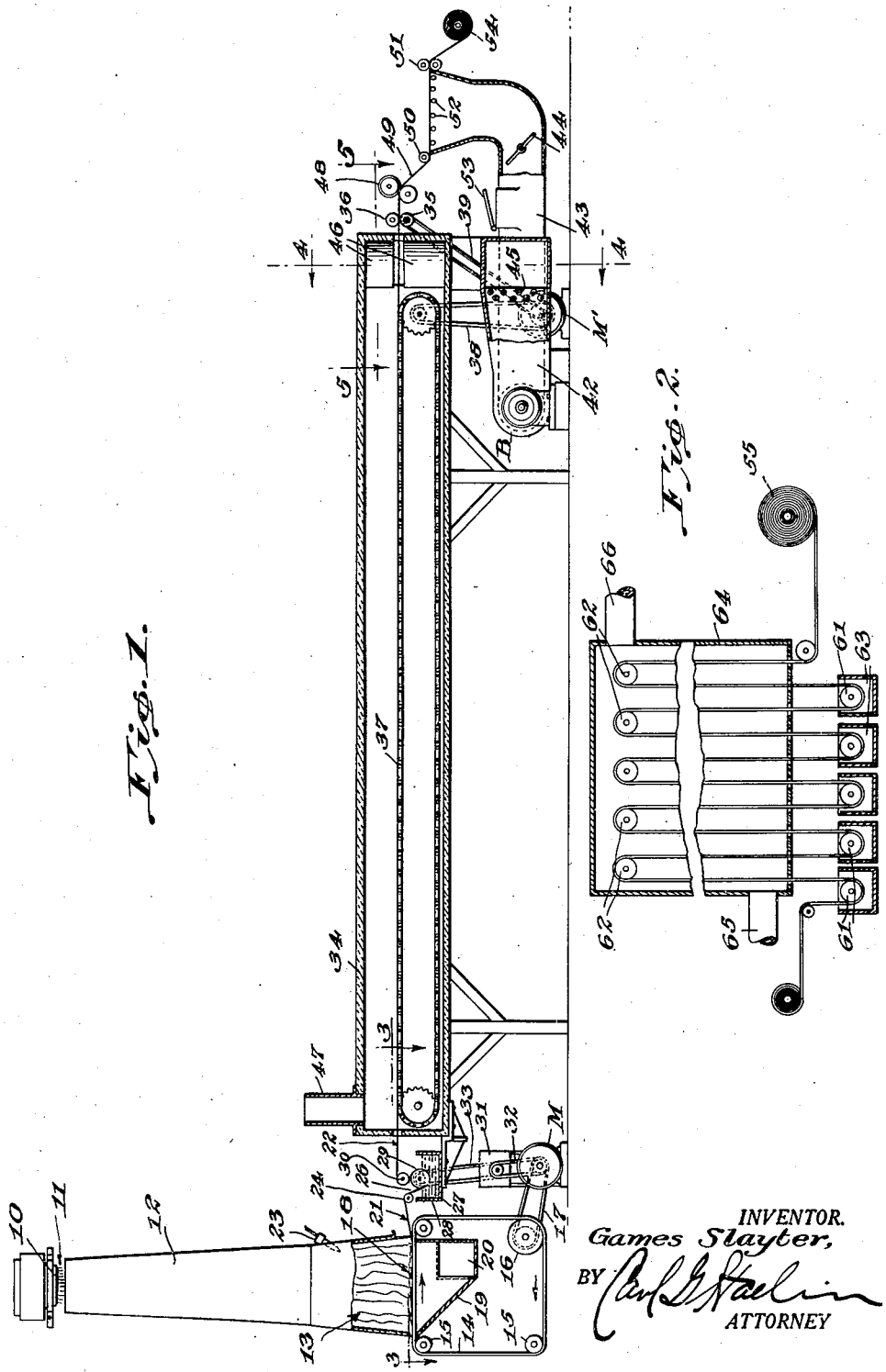

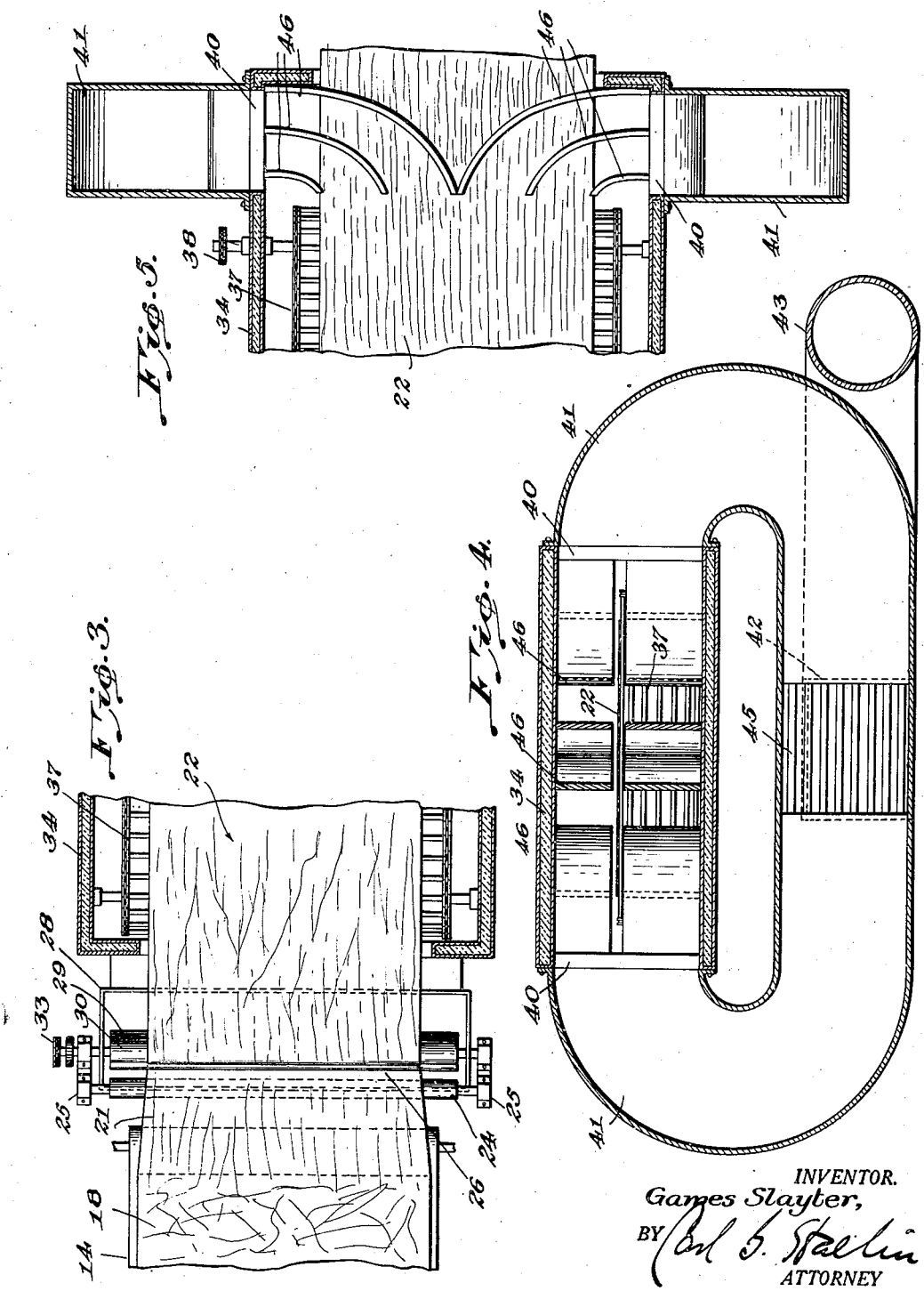

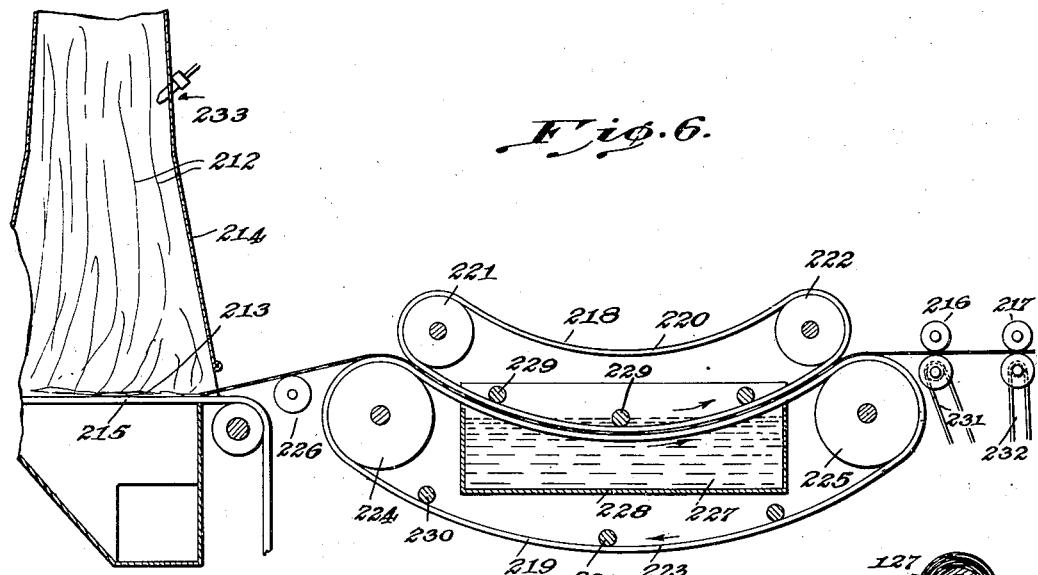
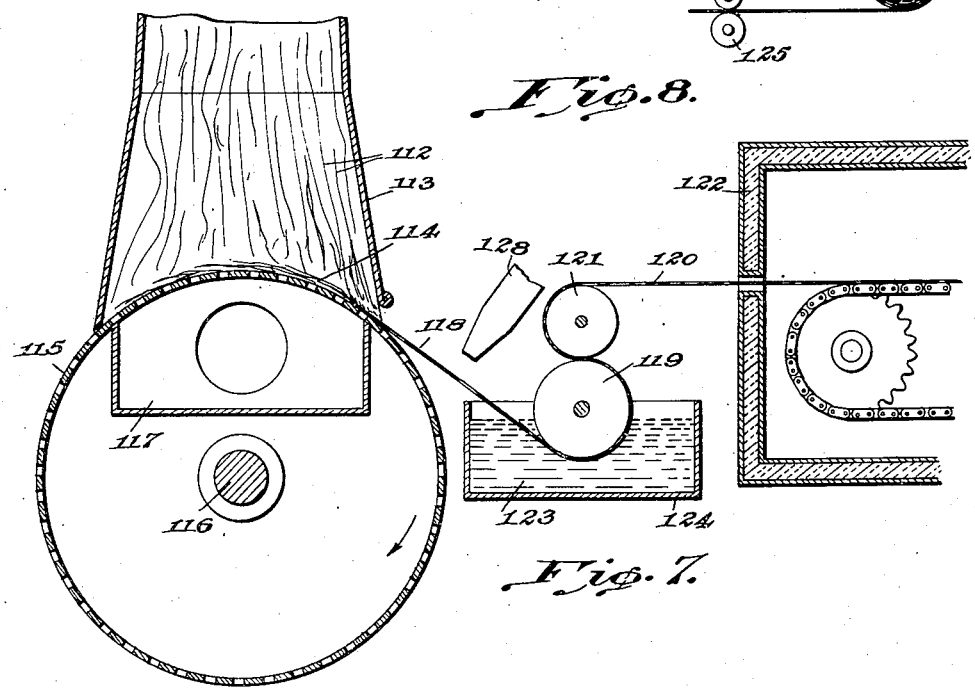

Patented Dec. 22, 1942

2,306,347

UNITED STATES PATENT OFFICE 2,306,347

METHOD AND APPARATUS FOR MAKING FIBROUS GLASS PRODUCTS

Games Slayter, Newark, Ohio, assignor to Owens-Corning Fiberglas Corporation, a corporation of Delaware Application July 28, 1939, Serial No. 287,129

13 Claims. (Cl. 154—1)

The present invention relates to glass wool products and more particularly to matted or webbed fibrous products in sheet form and in which the basic fibers that cooperate to make up the same are formed of glass in accordance with well known methods for producing such fibers and are preferably bonded together by a suitable adhesive or bonding material and, if desired, impregnated completely.

Sheet material of the character set forth above has been manufactured in various forms to produce a variety of products that have been found useful particularly in the fields of electrical, sound and heat insulation as well as in many other fields. Exemplary of the various forms in which such sheet material containing glass fibers may be manufactured and of the various uses to which it may be put are the United States patents to Baird and Simison, No. 2,133,183, dated October 11, 1938; Frederick, No. 1,284,295, dated November 12, 1918; and Waddell, Re. 16,548, dated February 8, 1927. The British patents to Alfeis, Nos. 393,270 and 406,505, dated May 30, 1933, and March 1, 1934, respectively, are further illustrative of other uses to which sheet material of this character may be put. In addition to the uses exemplified in the above mentioned patents, the sheet material has been found useful in the field of filtration of either gases or liquids.

The glass wool fibers which are used as the basic material for the formation of such matted fibrous products are relatively fine and various methods have been employed in their production. One method of forming such glass fibers is disclosed in the patent to Slayter and Thomas, No. 2,133,236, dated October 11, 1938, and consists briefly in issuing small streams of molten glass from a bushing and applying air or steam at high pressure to the streams to draw the glass out into fine threads or filaments which are instantaneously solidified while suspended in the air and which accumulate to form a mass known as glass wool. The accumulated fibers thus produced are arranged haphazardly in the mass and follow no definite arrangement or pattern.

The processes heretofore employed for producing matted fibrous products from the glass fibers thus formed are relatively simple and one such process is mentioned in the patent to Baird and Simison, above cited, and briefly consists in spreading the glass wool uniformly on a conveyor or the like and transferring the same thereby to calendering or rolling equipment by means of which the wool with its haphazardly arranged fibers is compressed to the desired thickness or density. The bonding material may be applied to the glass wool prior to the compressing operation or may be applied thereafter as circumstances may require. Frequently the bonded and matted sheet product is further treated in an impregnating tower or the like by means of which dielectric or other properties may be imparted to the product.

Sheet material produced by the process set forth above possesses one serious limitation, namely lack of sufficient tensile strength, which renders the completed product unfit for various uses to which it otherwise might be put. Furthermore, because of the relatively small degree of tensile strength possessed by the matted glass wool on the conveyor, manufacturing difficulties are encountered in managing and handling the material after the same has been removed therefrom. The material is incapable of properly supporting itself during the calendering or rolling operations and, if any wet impregnation process is contemplated employing an impregnating tower, the material is unable to support its own weight and will break down if it is carried to any great height while wet in the impregnating tower. The latter is true even when the material conducted to the impregnating tower has embodied therewith a bonding agent for in such an instance the wet process which is carried out in the tower effects a destruction of the strength of the bonding agent thus loosening the glass fibers from the relative positions in which they previously had been bonded.

Not only are the fibers merely loosened from their prior fixed positions in the material but they are furthermore lubricated by the wet process so that the tensile strength of the material is still further reduced to a point where handling of the same in the tower is impossible. By the same token, the wet strength of the completed product if a bonding agent is employed being considerably less than the dry strength thereof, definite limitations in the use of the product are met, especially where heat or moisture that is liable to soften and break down the bonding agent is encountered.

The present invention is designed to overcome the above noted limitations that are attendant upon the manufacture and use of matted sheet material containing haphazardly arranged glass fibers.

One of the principal objects of the invention is to increase the tensile strength of sheet products of this character. Another and equally important object of the invention is to produce such a material which will be of uniform thickness and density throughout yet in which the thickness thereof may be reduced to a minimum without the appearance of voids or dense matted areas. In other words, it is an object of the invention to provide a method and an apparatus by means of which matted sheet material of the character set forth above and having a uniform cross section both as to thickness and fiber density may be produced.

A still further object of the invention is to provide a drafted matted sheet material containing glass fibers which, because the fibers have been drawn into directions that are generally in parallelism, are in close proximity to each other and present a greater overall glass area affording a high dielectric shield, thus rendering the sheet especially useful as an electrical insulating material.

I have found that these objects may be attained by arranging the individual fibers in the product to have predominant components of direction in parallelism with the longitudinal direction of the sheet so that any tendency of the material to yield when tension is applied thereto in the direction of its length is resisted by the combined tensile strength of a greater number of these fibers.

Toward this end, the invention contemplates, as a process, a drafting step which may be continuously performed on the matted sheet of glass fibers which has been deposited on the moving conveyor of the Baird process mentioned above and by means of which the mass of fibers is picked up and the resultant sheet of material stretched, so to speak, in the direction of its length with the individual fibers assuming a more or less parallel relationship in the sheet but nevertheless with many of the fibers overlapping each other at rather acute angles in order that sufficient lateral strength will be attained to hold the sheet together. As an arbitrary preliminary step in the process, a suitable lubricant may be applied to the fibers during or shortly after their formation in the forming hood in order to reduce to a minimum any frictional resistance existing between the various fibers in the glass wool which are in direct contact with each other. The net result of this lubricating operation is to free the individual fibers in the mass so that by the succeeding drafting operation the individual lubricated fibers will more readily assume their generally parallel relationship.

In conjunction with the drafting operation, an adhesive or bonding material is applied to the sheet which, upon subsequent drying, anchors the fibers in their generally parallel positions.

I have found that the sheet product thus formed is possessed of considerably increased tensile strength as compared with the conventional sheets. It has a decreased thickness while attaining uniformity of fiber distribution, and its density is materially increased.

If the material is subjected to the usual wet impregnation process in an impregnating tower or is put to a use wherein the softening action of heat or moisture is encountered, its wet strength being materially increased, will in either case aid in preventing the sheet material from being stretched or pulled apart to the point of rupture.

Other objects and advantages of the invention, not at this time more particularly enumerated, will become apparent as the nature of the invention is better understood.

In the accompanying three sheets of drawings:

Fig. 1 is a side elevational view, partly in section and diagrammatic in its representation, of an apparatus for producing drafted sheet material in accordance with the principles of the present invention.

Fig. 2 is a fragmentary side elevational view, partly in section, of an impregnating tower by means of which the drafted matted sheet material is subjected to an impregnating process.

Fig. 3 is a sectional view taken substantially along the line 3—3 of Fig. 1.

Fig. 4 is a sectional view taken substantially along the line 4—4 of Fig. 1.

Fig. 5 is a sectional view taken substantially along the line 5—5 of Fig. 1.

Fig. 6 is a fragmentary side elevational view, partly in section and diagrammatic in its representation, of a modified form of apparatus for producing drafted matted sheet material.

Fig. 7 is a side elevational view similar to Fig. 6 of another modified form of apparatus for producing the material, and Fig. 8 is a fragmentary side elevational view, partly in section, of a pair of pinch rolls and a packaging spool employed in connection with the apparatus shown in Fig. 7.

Referring now to Fig. 1, a conventional type of apparatus for producing a matted sheet of glass wool is disclosed and includes one or more electrically heated bushings 10 from which a plurality of streams 11 of molten glass issue continuously. The streams of molten glass are impinged upon by gaseous blasts issuing from a series of jets (not shown) and are attenuated into a series of relatively long, if not continuous, fine streams which pass through a forming hood 12 and are suddenly solidified therein to produce correspondingly long and fine threads or filaments 13 which are intermingled with each other indiscriminately and cooperate to make up a mass of glass wool within the forming hood.

Arranged at the bottom of the forming hood 12 is an endless foraminous surface or conveyor 14 which may be in the form of a screen mounted on rollers 15 and driven continuously in the direction indicated by the arrow by means of a driving roller 16 which is in turn driven by means of a belt 17 from an electric motor M or other suitable source of driving power. The long threads or filaments 13 are conveyed by the gaseous blast through the forming hood 12 and are forcibly deposited upon the foraminous surface 14 where they are arrested and collect in the form of a mat 18.

Underneath the surface 14 is a suction box 19 which communicates through a suction tunnel 20 with a suitable exhausting means (not shown), the suction box serving to withdrawn the vehicular blast and facilitating retention of the mat 18 upon the surface 14 as it is collected with the comparatively long and fine fibers thereof arranged haphazardly in various directions in the matted web structure.

After the fibers have been collected in the form of the mat 18, they are drawn off in the form of a web in the general direction of travel of the screen surface 14 and slightly upwardly therefrom as indicated at 21 and at a speed considerably higher than the speed of travel of the screen surface. In this manner a relatively thin sheet of material which nevertheless is of uniform thickness and fiber density issues continuously from the forward edge of the progressing mat 18 and attains its ultimate drafted sheet form at 22 as will appear presently. The actual thickness of the sheet issuing at 21 from the mat 18 may be regulated within limits in several different ways. Other things being equal, the rate of fiber deposition on the foraminous surface 14 may be altered to produce a thicker or thinner mat as the case may be and a correspondingly thicker or thinner resultant drafted sheet. The rate of drafting of the sheet may be varied to control the thickness of the drafted sheet. The rate of movement of the foraminous sheet or surface 14 may also be increased or decreased, which is another way of varying within limits the fiber distribution and deposition on the surface to produce a thinner or thicker mat as the case may be and a correspondingly thinner or thicker drafted sheet. Obviously, the three variable factors mentioned above may be varied among themselves to produce a drafted sheet 22 of varying thickness or to produce such a sheet in which the fiber density, i. e. the number of fibers per unit area, is increased or decreased.

Referring now to Fig. 3, it will be seen that during the drafting operation the haphazardly arranged glass fibers which cooperate to make up the matted web 18 are pulled from their respective positions in the mat into a general longitudinal direction as indicated by the fine lines of this figure which represent the fiber distribution. A condition of exact parallelism of all the fibers is not sought for nor desired and it is to be noted that in the resultant drafted sheet 22 many, if not all, of the fibers overlap or interlace to render to the sheet a certain degree of cohesion in a transverse direction. The amount of such interlacing of fibers and the resultant degree of transverse tensile cohesion of the sheet 22 is dependent mainly upon the degree of drafting, a slight degree of drafting resulting in a correspondingly slighter shift of the fibers from their original positions as they are drawn from the mat 18 and a high degree of drafting resulting in a correspondingly greater shift of the fibers. In other words, the greater the degree of drafting, the more predominant will be the component of direction of the fibers extending longitudinally of the resulting drafted sheet. The degree of drafting resorted to is dependent upon the physical properties desired in the finished drafted sheet and particularly upon the relative strengths desired in longitudinal and transverse directions. For most practical purposes it has been found that where the fiber length is comparatively great a three to one draft (i. e. the character of draft obtained when the sheet 22 is moved away from the mat 18 at a surface speed three times the surface speed of the mat) will produce a superior product possessing high tensile strength longitudinally and ample cohesion transversely. Preferably the degree of drafting should be kept between two to one and four to one. In certain instances however even greater limits may be resorted to as for example five to one but for most practical purposes such high degrees of drafting may defeat their purpose and are not resorted to.

In order to facilitate predominant longitudinal fiber orientation during the actual drafting operation, a suitable lubricant may be applied to the fibers or filaments 13 which are produced in the forming hood 12 and accordingly one or more nozzles 23 extend into the hod for the purpose of spraying the lubricant thereinto. Various lubricants may be employed in the forming hood 12 and among these are animal, vegetable and/or mineral oils, soaps, fatty acids, glycerin, graphite and the like. In this manner the frictional resistance existing between the various fibers in the mat 18 is reduced to a minimum and during the drafting operation the fibers may more readily assume their oriented positions.

Means is provided for saturating the sheet with a solution of a suitable bonding agent or material which, upon drying or other treatment, hardens and provides a fixative for the fibers in order to anchor the oriented fibers contained in the drafted sheet in their respective positions. Such saturation of the sheet may be performed before, during or after the drafting operation as desired. For convenience however it is preferable to saturate the sheet with the bonding material or solution during a portion of the drafting operation.

Any suitable manner of drafting the sheet 22 from the mat 18 may be resorted to and, for convenience both from the standpoint of efficient drafting and efficient application of the bonding solution, the web 21 (Figs. 1 and 2) is carried over a drafting bar 24 which is preferably in the form of an idler roller supported forwardly of the mat 18 in bearings 25. The drafting bar 24 is positioned at an elevation slightly above the level of the conveyor 14. The web 21 passes over the drafting bar 24 and from thence downwardly as at 26 beneath the surface of a pool 27 of the bonding solution maintained in a tank 28 and beneath a partially submerged lower roller 29 which may be perforated and which cooperates with an upper roller 30 to provide a pair of drafting pinch rolls between which the saturated web 26 passes prior to emerging in the form of the drafted sheet 22. The drafting rolls 29, 30, serves the dual functions of controlling the extent of the drafting operation and of squeezing excess bonding material from the web 26 in order that the same may be returned by gravity to the tank 28.

In order to vary the extent of the drafting operation, means is provided for varying the surface speed of the drafting rolls and accordingly the lower roller 29 thereof is operatively connected through a variable speed transmission device 31 by means of belts 32 and 33 respectively.

The saturated sheet 22 emerging from the drafting rolls 29, 30, is pulled laterally through a drying oven 34 by means of a pair of pinch rolls (Figs. 1 and 8), the latter including a lower driving roller 35 and an upper cooperating roller 36. In passing through the drying oven 34, the sheet 22 may be supported if desired upon an endless conveyor 37 which is driven from an electric motor M' by means of a driving chain 38. The motor M' may be utilized for driving the lower roller 35 of the pinch rolls 35, 36, and toward this end a driving belt 39 connects the motor and roller.

The driving unit which controls the pulling of the sheet 22 through the drying oven 34 is maintained independent from the driving unit which controls the formation of the sheet 22 from the mat 18 in order that a slight drafting tension may be applied to the sheet 22 passing through the oven. The degree of drafting of the sheet 22 in the oven 34 however is very slight, as for example from 1.05 to 1 or 1.5 to 1 and is merely sufficient to prevent transverse wrinkling of the sheet as the same is dried and is not so great as to cause longitudinal wrinkling thereof upon hardening of the bonding material.

In order to effect drying of the bonding material with which the sheet 22 is saturated or to otherwise harden the same, means is provided for passing heated drying air through the oven counter to the direction of movement of the sheet. For this purpose, the rear end of the oven 34 (Figs. 1, 4 and 5) is provided with a pair of oppositely disposed intake ports 40 which communicate through a pair of branch conduits 41 and a manifold conduit 42 with the exhaust side of a blower B, the intake side of the latter communicating with an intake conduit 43 having a damper 44 disposed therein. Electrical, steam or other heating elements 45 extend across the manifold exhaust conduit 42 and serve to heat the air entering the oven 34. A series of baffles 46 deflect the air longitudinally of the drying oven 34 and the heated air after passing over the moving sheet 22 and to some extent underneath the sheet and upwardly therethrough, passes from the drying oven through an exhaust stack 47.

The completely dried and finished matted sheet material issuing from the pinch rolls 35, 36, is especially adapted to a wide variety of uses depending in particular instances upon various factors such as the nature and percentage of the bonding material contained in the finished sheet, the amount of drafting to which the sheet has been subjected, etc. No attempt is made herein to enumerate all of the uses to which the basic product or sheet issuing from the pinch rolls 35, 36, may be put or to tabulate the character or percentage of bonding material used in the product. It will be understood that these latter factors may be varied to suit the various requirements of use.

The sheet material has been found useful in many forms in the field of electrical insulation and accordingly in Fig. 1 there is illustrated the formation of the sheet 22 into narrow strips that may be used as tape in the manner of ordinary varnished cambric in the wrapping of wires, coils, cables and the like. Accordingly the material issuing from the pinch rolls 35, 36, passes through a pair of slitting rolls 48 by means of which it is subdivided into narrow lengths or tapes 49 which pass beneath a roller 50 and through a pair of pinch rolls 51 that conduct the slitted material across the mouth of the intake conduit 43. A series of bars 52 serve to support the slitted material as it passes from the roller 50 to the pinch rolls 51. A hinged valve or plate 53 serves to open or close alternatively an auxiliary intake port formed in the intake conduit 43 and thus air intended for passage through the drying oven 34 may be first drawn through the slitted material provided the damper 44 is open and the valve 53 is closed. If the positions of the damper and valve are reversed, air may be obtained directly from the atmosphere without first passing through the material. The finished slitted material in the form of parallel rows of narrow tape may be finally conducted to and assembled upon a packaging roller 54.

Any one of a number of known electrical varnishes may be employed as a bonding agent or material in the production of this type of electrical tape, a solution of a synthetic resin such as Bakelite being found suitable. In such an instance actual heat hardening or conversion of the material may occur in the drying oven 34 while the solvent is driven off.

Whereas when impregnating cotton cambric or other material having organic fibers successive applications with a comparatively weak solution of the bonding material with intervening drying stages must be resorted to to prevent rotting of the fabric, it is possible in the present instance to employ but a single application of a bonding material of relatively high concentration.

If the final product is to be utilized in the manner of friction tape for the covering of spliced wires or the like, a bonding material having a certain degree of tackiness or adhesive quality is desirable. Examples of such a binder are various types of gums, asphaltic compounds, coal tar products, pitch and the like. These may be used in solution and the volatile constituents thereof driven off in the drying oven 34.

The sheet material may be used as an inorganic paper for various uses, as for example as a wrapping or cover for a heat insulating bat or the like. It has been found useful as a substitute for mica separation strips used in connection with commutator bars and in various other places where an impervious sheet having high dielectric qualities is required.

In such an instance the slitted material may be withdrawn from the packaging roller 54 and conducted through an impregnating tower which is diagrammatically shown in Fig. 2 and by means of which the material is successively coated with an electrical varnish calculated to impart a hard glossy and impervious finish to the sheet. The finished sheet is collected on a packaging roller 55.

The impregnating tower of Fig. 2 briefly includes a lower series of submersion rollers 61 and an upper series of lifting rollers 62 around which the material passes in serpentine fashion. Each submersion roller 61 operates in a receptacle or tank 63 containing a solution of the impregnating material and the sheet material in passing under each submersion roller is submerged in its respective pool of the solution. As the sheet rises from each submersion roller 61 and as it descends to the next adjacent roller it is dried in a tower 64 through which heated air is passed from an inlet conduit 65 to an outlet conduit 66. Various bonding materials may be employed and as in the case of electrical tape, a solution of a synthetic resin or varnish is satisfactory. It is worthy of note that if a bonding material is used that is soluble by the wet process conducted in the impregnating tower, the relatively high tensile strength afforded by the fiber arrangement of the sheet material will prevent the latter from pulling apart while wet in the tower.

If the material is to be employed for separating battery plates, liquid or air filtration, friction materials, light diffusing sheets or screens, wicks, etc., a bonding agent which will not destroy the porosity of the sheet is desirable. Again a relatively weak solution of a phenolic resin, rubber, starch, gelatin, polystyrene, methyl methacrylate, or the like may be utilized according to the particular conditions to which the sheet must be subjected.

A bituminous bonding agent, asphalt, various gums, ground cork, hardenable oils, coal tar products and pitch have been used as a bonding agent in the manufacture of sheathing for underground pipes, shingles, roofing paper, flooring, etc.

A great variety of other bonding materials are available for the many uses to which the sheet material may be put. It has been seen that solutions of the various resins are well adapted as bonding agents when the sheet material is used in the field of electrical insulation. The silica resins, urea-formaldehyde resins, furfurol resins and others have extensive application when employed as a bonding agent or impregnant. Likewise various coal tar products, asphaltic compositions, pitch and the like have a wide field of use as bonding materials. Inorganic materials such as various clays including Bentonite, "Alsifilm," and other hydrous oxides such as oxides of aluminum and magnesium are effective bonding agents or impregnants for specific uses. If desired such inorganic materials may be rendered waterproof by base exchange with metal salts. Waxes, cellulose esters, vinyl compounds, glycerin, rubber compounds, latex and the like are also capable of use as bonding agents or impregnants. Various heat hardening oils such as soy bean, cottonseed, linseed and tung oil are also capable of such use. The list of bonding agents that may effectively be used is practically inexhaustible but in general it may be said that practically any material in suspension or solution that may be precipitated or concentrated, or any thermoplastic or thermosetting material may successfully be utilized as a bonding agent for specific or general uses. Such materials may be used alone or as mixtures and may be applied to the sheet material either as solutions or emulsions or in the raw state.

The principle of drafting and fiber orientation involved in the form of apparatus shown in Figs. 7 and 8 is substantially the same as that described in connection with the preferred form of apparatus illustrated in Fig. 1. The relatively long substantially continuous threads or filaments 112 which are formed in the forming hood 113 are deposited upon the curved surface of a perforate drum 115 in the form of a mat 114. The drum 115 is mounted upon a central shaft 116 and is rotated in the direction of the arrow of this figure. A suction box 117 within the drum 115 serves to hold the mat in position for drafting. The web 118 is drafted forwardly and downwardly beneath and around the lower roller 119 of a pair of drafting rolls and the drafted sheet 120 is conducted from the upper roller 121 of the rolls to the drying oven 122. The drafting roller or bar 24 utilized in connection with the drafting process illustrated in Fig. 1 is omitted and drafting takes place directly both in the plane portion of the web and in the curved portion extending around the partially submerged drafting roller 119 which extends into a pool 123 of the bonding agent contained in a tank 124. The drum 115 and drafting rollers 119, 121, are independently driven in order that the extent of the draft may be varied. The drafted sheet 120 is conducted through the drying oven 122 as in the other form of the invention previously described, and after passing through the pinch rolls 125, 126, is collected on a packaging roller 127.

In this latter form of the invention, as well as in the form illustrated in Fig. 1, the bonding agent may be applied to the web 118 in the form of a spray by means of a nozzle 128 positioned between the drum 115 and drafting rolls 119, 121, in which case the tank 124 may be dispensed with if desired.

The form of apparatus shown in Fig. 6 is primarily designed for use when the fibers or filaments 212 deposited in the form of a mat 213 in the forming hood 214 on the foraminous surface of the conveyor 215 are relatively short. The mat 213 is conveyed toward successive pairs of drafting rolls 216 and 217 respectively by means of a pair of caterpillar belt conveyors 218 and 219 respectively which cooperate with each other. The upper conveyor 218 includes a perforated belt 220 mounted on rollers 221 and 222 while the lower conveyor includes a similar perforated belt 223 mounted on rollers 224 and 225. The two conveyors 218 and 219 are driven in timed relation to each other and move in the direction indicated by the arrows with equal surface speeds. A supporting roller 226 prevents sagging of the mat 213 in the region between the conveyor 215 and the conveyors 218, 219. The caterpillar belts submerge the material in a pool 227 of bonding liquid in a tank 228. The belts 220, 223, being perforate, the solution will thus thoroughly penetrate the undrafted web. A series of bars 229 extend transversely of the upper conveyor 218 and a similar series of bars 230 extend across the lower conveyor 219, the upper series serving to effectively submerge the mat 213 in the pool 227.

The mat 213 passes to the drafting rolls 216 and 217 and during its passage from the first pair 216 to the second pair 217 it is drafted or stretched in the direction of its length similar to the manner previously described in connection with the form of invention shown in Fig. 1. Toward this end, the pairs of rolls 216 and 217 are driven by means of belts 231 and 232 respectively so that the surface speed of the latter pair is in excess of the surface speed of the former pair.

Inasmuch as the individual fibers comprising the mat 213 are fairly short as contrasted with the relatively long or continuous fibers comprising the mat 18 of Fig. 1, the full extent of the drafting operation carried out on the long fibered mat is not permissible in the present instance. Whereas a three to one draft may be permissible or desirable in the first instance, such a draft in the latter instance might not be satisfactory and might serve to pull many of the short fibers completely out of engagement with adjacent fibers. It will be understood that the amount of draft employed will vary with the average fiber lengths encountered and with the uses to which the finished sheet material is put.

In order to facilitate fiber orientation during the drafting process, a series of jets 233 may be associated with the forming hood 214 for the purpose of applying a lubricant to the threads or filaments 212 as they are formed to lubricate the same.

Other modifications of the apparatus and method by means of which sheet material of this character may be formed are contemplated within the spirit and scope of the appended claims.

I claim:

1. The method of producing fibrous sheet material from a matted body of fibrous glass which comprises forming a mat in which the filaments are arranged in haphazard relation, drafting from the body a web in sheet form having a thickness less than that of said body, said drafting being of an extent to cause the individual filaments of the web to orient themselves at relatively small acute angles to the direction of drafting and to be interlaced and overlapped.

2. The method of producing fibrous sheet material from a matted body of fibrous glass wherein the filaments are haphazardly arranged which comprises drafting from the body a web in sheet form having a thickness less than that of said body, said drafting being sufficient to cause the individual filaments of the web to orient themselves at relatively small acute angles to the direction of drafting and to be interlaced and overlapped, and bonding together the drawn filaments in their respective drawn positions.

3. The method of producing fibrous sheet material from a matted body of fibrous glass wherein the filaments are haphazardly arranged which comprises engaging the filaments of the matted body along an edge thereof and moving said engaged filaments in parallel directions away from the body to an extent producing a web of adhering filaments in criss-crossed relation but having predominant components of direction parallel to said direction of movement.

4. The method of producing fibrous sheet material from a matted body of fibrous glass wherein the filaments are haphazardly arranged which comprises elongating the body while maintaining substantial width thereof and thereby drawing the individual filaments of the body in the direction of elongation to an extent whereat they have predominant components of direction substantially parallel to the direction of elongation and are interlaced and overlapped sufficiently to provide cohesion across the width of the body.

5. The method of producing fibrous sheet material the individual fibers of which are comprised of glass and have predominant components of direction lying parallel to one another which comprises continuously accumulating glass filaments as they are produced from a forming operation in the form of a matted body in which the filaments are haphazardly arranged, and continuously drafting a relatively thin web of the filaments from the body as the latter accumulates, said drafting being sufficient to cause the filaments to extend in the general direction of elongation of the web but insufficient to bring all of the filaments into parallelism.

6. The method of producing fibrous sheet material the individual fibers of which are comprised of glass and have predominant components of direction lying parallel to one another which comprises continuously depositing glass filaments in haphazard fashion on a continuously moving surface to produce a matted body of fibrous glass thereon, and continuously drafting a relatively thin web of the filaments coextensively from the forward edges of the progressing matted body on the surface at a rate sufficient to orient substantially all of the filaments in the web to lie at relatively small acute angles to one another but to remain interlaced irregularly with one another to provide lateral tensile strength in the sheet, simultaneously impregnating the web with a bonding material, and causing the bonding material to harden to anchor the individual filaments of the web in the respective positions to which they have been pulled in the drafting process.

7. The method of producing fibrous sheet material the individual fibers of which are comprised of glass and have predominant components of direction lying in substantial parallelism which comprises continuously depositing glass filaments in haphazard directions on a continuously moving foraminous surface in a restricted region above the surface while simultaneously maintaining a differential air pressure on opposite sides of the surface in said region to progressively build up a matted body of glass wool in the region, and continuously engaging the forward edge of said body and pulling the same along the entire width of the edge from said surface against the resistance afforded by said differential air pressure at a rate sufficient to orient substantially all of the filaments in the web to lie at relatively small acute angles to one another but to remain interlaced irregularly with one another to provide lateral tensile strength in the sheet.

8. The method of producing a thin fibrous sheet material from glass filaments attenuated by means of a high pressure vehicular blast which comprises directing said filaments and blast against a continuously moving foraminous surface, arresting the filaments thereon in the form of a mat with the filaments lying haphazardly in all directions substantially parallel to said surface, engaging said mat and pulling a web of the filaments therefrom along the entire width of the forward edge thereof at a rate of speed sufficient to orient substantially all of the filaments in the web to lie at relatively small acute angles to one another but to remain interlaced irregularly with one another to provide lateral tensile strength in the sheet thereby causing the thickness of the thus drafted web to be substantially reduced under the thickness of the original mat and causing the glass density of the sheet to be increased.

9. The method of producing a thin fibrous glass sheet from filaments attenuated by means of a high pressure vehicular blast which comprises directing said filaments and blast against a continuously moving foraminous surface, arresting the filaments thereon in the form of a mat with the filaments lying haphazardly in all directions substantially parallel to said surface, engaging said mat and pulling a web of the filaments therefrom along the entire width of the forward edge thereof at a rate of speed sufficient to orient substantially all of the filaments in the web to lie at relatively small acute angles to one another but to remain interlaced irregularly with one another to provide lateral tensile strength in the sheet thereby causing the thickness of the thus drafted web to be substantially reduced under the thickness of the original mat and causing the glass density of the sheet to be increased, simultaneously coating the individual filaments as they are being pulled with a bonding agent, and causing the bonding agent to anchor the filaments in the respective positions to which they have been pulled.

10. Apparatus for producing fibrous sheet material the individual filaments of which are formed of glass and extend in directions having components predominantly parallel to the longitudinal axis of the sheet comprising an endless movable surface, means for moving the surface at a predetermined rate of speed, means for depositing glass filaments haphazardly on the surface to progressively build up a matted body of filaments thereon, and means for continuously drafting a relatively thin web of the filaments coextensively from the forward edge of the matted body in the general direction of movement of the screen and at a rate of movement greater than the rate of movement of the screen which includes a pair of drafting rolls cooperating to draw the web from the body, and a drafting bar between the drafting rolls and the surface and over which said web is drawn by the drafting rolls.

11. The method of producing fibrous glass sheet material the individual fibers of which have predominant components of direction lying parallel to one another, which comprises continuously depositing glass filaments in haphazard fashion on a continuously moving surface to produce a mat of fibrous glass thereon in which the fibers are haphazardly arranged, and continuously drafting a relatively thin web of the filaments from the forward edge of the progressing mat on the surface at a rate sufficient to orient substantially all of the filaments in the web to lie at relatively small acute angles to one another but to remain interlaced irregularly with one another to provide lateral tensile strength in the sheet.

12. Apparatus for producing fibrous sheet material the individual filaments of which are formed of glass and extend in directions having components predominantly parallel to the longitudinal axis of the sheet, comprising an endless movable surface, means for moving the surface at a predetermined constant rate of speed, means for depositing glass filaments haphazardly on the surface to progressively build up a matted body of filaments thereon, a container for holding a pool of bonding material, means comprising a pair of superposed drafting rollers for continuously drafting a relatively thin web of the filaments coextensively from the forward edge of the matted body in the general direction of movement of the surface, the lower one of said rollers being at least partly submerged in the pool of bonding material whereby the web is impregnated as it is being drafted, and means for driving the drafting rollers at a rate of speed higher than the speed of movement of said surface.

13. Apparatus for producing fibrous sheet material the individual filaments of which are formed of glass and extend in directions having components predominately parallel to the longitudinal axis of the sheet, comprising an endless movable conveyor, means for moving the conveyor at a predetermined rate of speed, means for depositing glass filaments haphazardly on the conveyor to progressively build up a matted body of filaments thereon, means providing a pool of a liquid bonding material, a roll at least partly submerged in said pool for conducting the matted body through said pool to impregnate the same with the bonding material, a second roll cooperating with said first-named roll to express excess liquid from the web and to draw the web from the conveyor, a pair of drafting rolls for elongating the impregnated matted body, and means for driving each pair of rolls independently of the other pair.

GAMES SLAYTER.